United States Patent [19]

Hutchinson et al.

[11] Patent Number: 5,317,899
[45] Date of Patent: Jun. 7, 1994

[54] METHOD FOR DETECTING LEAKS IN UNDERGROUND PRODUCT LINES

[75] Inventors: Ray J. Hutchinson; Patrick W. Schoen, both of Houma, La.

[73] Assignee: Control Engineers, Inc., Houma, La.

[21] Appl. No.: 990,858

[22] Filed: Dec. 11, 1992

[51] Int. Cl.$^5$ ............................................. G01M 3/28
[52] U.S. Cl. ............................................. 73/40.50 R
[58] Field of Search .................... 73/40.5 R, 40, 49.1

[56] References Cited

U.S. PATENT DOCUMENTS

| | | | |
|---|---|---|---|
| 2,928,247 | 3/1960 | Hubbell | 61/0.5 |
| 2,952,387 | 9/1960 | Fowler et al. | 222/52 |
| 2,952,390 | 9/1960 | Fowler et al. | 222/63 |
| 2,979,939 | 4/1961 | Shuh | 73/40 |
| 3,183,723 | 5/1965 | Deters | 73/40.5 |
| 3,261,201 | 7/1966 | Pottash | 73/40.5 |
| 3,273,753 | 9/1966 | Johnson et al. | 222/52 |
| 3,350,704 | 10/1967 | Kessler | 340/242 |
| 3,439,837 | 4/1969 | Hearn et al. | 222/52 |
| 3,454,195 | 7/1969 | Deters | 222/52 |
| 3,505,513 | 4/1970 | Fowler et al. | 235/151.34 |
| 3,664,357 | 5/1972 | Kreiss | 137/2137 |
| 3,692,050 | 9/1972 | Deters | 137/491 |
| 3,702,074 | 11/1972 | Mullen | 73/40.5 |
| 3,738,531 | 6/1973 | Mitchell | 222/52 |
| 3,788,127 | 1/1974 | Marsh | 73/40 |
| 3,866,798 | 2/1975 | Marsh | 222/52 |
| 3,935,567 | 1/1976 | Reynolds | 340/242 |
| 3,940,020 | 2/1976 | McCrory et al. | 222/52 |
| 3,958,449 | 5/1976 | Drescher et al. | 73/40.5 |
| 3,962,905 | 6/1976 | Jouve | 73/40.5 |
| 3,966,088 | 6/1976 | Reynolds | 222/63 |
| 4,012,944 | 3/1977 | Covington et al. | 73/40.5 |
| 4,088,985 | 5/1978 | Saito et al. | 340/237 |
| 4,088,987 | 5/1978 | Resler et al. | 340/242 |
| 4,116,044 | 9/1978 | Garrett | 73/40.5 |
| 4,131,216 | 12/1978 | Gerstenmaier et al. | 222/52 |
| 4,144,743 | 3/1979 | Covington et al. | 73/40.5 |
| 4,308,746 | 1/1982 | Covington | 73/40.5 |
| 4,338,812 | 7/1982 | Lindgren | 73/40.5 |
| 4,397,405 | 8/1983 | Batson | 222/14 |
| 4,404,842 | 9/1983 | Mooney | 73/40.5 |
| 4,410,109 | 10/1983 | Murrell et al. | 222/52 |
| 4,496,077 | 1/1985 | Zuehlsdorf | 222/61 |
| 4,586,033 | 4/1986 | Andrejasich | 340/603 |
| 4,608,857 | 9/1986 | Mertens et al. | 73/40.5 |
| 4,644,354 | 2/1987 | Kidd | 340/870.27 |
| 4,658,986 | 4/1987 | Freed et al. | 222/52 |
| 4,712,097 | 12/1987 | Hashimoto | 379/40 |
| 4,715,214 | 12/1987 | Tveter et al. | 73/49.2 |
| 4,721,950 | 1/1988 | Andrejasich et al. | 340/603 |
| 4,876,530 | 10/1989 | Hill et al. | 340/605 |
| 5,072,621 | 12/1991 | Hasselmann | 73/40.5 R |
| 5,090,234 | 2/1992 | Maresca, Jr. et al. | 73/40.5 R X |
| 5,152,167 | 10/1992 | Moody | 73/40.5 R X |
| 5,201,212 | 4/1993 | Williams | 73/40.5 R |

FOREIGN PATENT DOCUMENTS

| | | | |
|---|---|---|---|
| 2603715 | 8/1977 | Fed. Rep. of Germany | 73/40.5 R |
| 85239 | 6/1980 | Japan | 73/40.5 R |
| 115700 | 9/1980 | Japan | 73/40.5 R |
| 18200 | 2/1981 | Japan | 73/40.5 R |
| 58-27041 | 2/1983 | Japan | . |
| 58300 | 4/1984 | Japan | 73/40.5 R |
| 25740 | 1/1992 | Japan | 73/49.1 |

OTHER PUBLICATIONS

Installation & Operation Guide for Series 3000 Underground Storage Tank and Pressurized Pipe Monitoring System; Technical Manual; Revised Oct. 1990; pp. 1-1 through 7-106.

*Primary Examiner*—Hezron E. Williams
*Assistant Examiner*—Joseph W. Roskos
*Attorney, Agent, or Firm*—Arnold, White & Durkee

[57] ABSTRACT

An improved method for detecting small leaks in underground pressurized piping systems is disclosed. In particular, the method comprises the steps of taking pressure measurements over identical time intervals from a product line at a pressure above the pump discharge pressure while the product pump is running. Thereafter, the absolute value of the difference between successive pressure decays is calculated and compared to an acceptable value. Next, the value of the latest pressure decay value is compared to acceptable and unacceptable values reflecting acceptable and unacceptable tightness of the product line.

11 Claims, 1 Drawing Sheet

METHOD FOR DETECTING LEAKS IN UNDERGROUND PRODUCT LINES

BACKGROUND OF THE INVENTION

A. Field of the Invention

This invention relates generally to a method for detecting leaks in pressurized piping systems and, in particular, to a method for detecting very small leaks of hydrocarbons, or like materials, in underground pressurized piping systems.

B. Background of the Invention

In gasoline service stations, it is common practice for automotive fuels to be stored in large underground tanks and pumped through underground product lines to various dispensing systems. In recent years, many steps have been taken to monitor and detect leakage from underground storage tanks and the associated product lines carrying the product to the dispensing systems. In that regard, the industry is continuously searching for new methods and technologies to enhance the ability to detect underground leakage from such systems in order to comply with regulations set by the Environmental Protection Agency (EPA), and other regulatory authorities.

In the past, serious problems have been created by leaks in underground piping, especially small but significant leaks of combustible explosive fluids which might go undetected for long periods of time. These problems are particularly critical in service stations, since the leakage of gasoline creates a serious hazard to life and property. Financial loss due to the escaping fluids is also a major problem. For these and other reasons, there has been a need within the industry for a simple, economical, and dependable system for detecting even minor leaks from underground product lines.

There have been several attempts in the prior art to provide a reliable, accurate, and economical method for detecting leaks from underground product lines based upon changes in flow rates, and/or measuring pressure within the product line. However, unlike the present inventive method, none of the prior art methods or techniques provided an economical system for detecting minor leaks while the product line was maintained at an elevated pressure due to continuous operation of the product pump. In addition, many of the prior systems are incapable of determining whether a product line is "tight", i.e., that the line does not have a leakage rate in excess of the minimum acceptable values set by various regulatory agencies.

SUMMARY OF THE INVENTION

The present invention provides an economical, reliable method for detecting minor leaks of liquid hydrocarbons, or like substances, from product lines connected to underground storage tanks, while accounting for changes in pressure due to the thermal contraction or expansion of the product within the product lines. The method involves measuring pressure decreases or increases within the product lines over a fixed period of time while the pump is operating against a closed system, thus enabling the pressure readings to be taken at elevated pressures where the pressure effects caused by thermal contraction and/or expansion can be more readily analyzed and accounted for in determining whether there is actual leakage from the product line. Thereafter, the method involves calculating pressure decay and/or increase values based upon measurements of the increase or decrease of the pressure within the product line over a fixed period of time. The difference between successive pressure decay/increase values are compared to determine if the product line is acceptable.

Prior to performing the inventive method disclosed herein, a so-called "Hourly Test" is performed upon the completion of a dispensing cycle to ensure that the product lines do not have leaks in excess of three gallons per hour (GPH) (defined at 10 PSI) or greater within one hour of its occurrence (hereinafter Hourly Test). Thereafter, upon successfully passing this Hourly Test, certain EPA regulations have required product lines to be tested annually for leaks of 0.1 GPH or greater (defined at 1.5 times the operating pressure of the system) or monthly for leaks of 0.2 GPH or greater. Preferably, the present invention provides an improved method for testing product lines such that they meet the above EPA mandated requirement of 0.1 GPH leakage at 40 PSI (hereinafter generally referred to as the Precision Test). However, in the event EPA requirements change, it is contemplated that the method of this invention will also be available to satisfy those requirements as well.

Preferably, the Precision Test is conducted upon successful completion of the Hourly Test. In this embodiment of the invention, a timer is initiated after the Hourly Test is completed. If any dispensing activity occurs before the timer reaches a preset value of, for example, 15 minutes, or if any dispensing occurs during the Precision Test, the Precision Test is aborted. After the timer reaches its preset value with no dispensing, the Precision Test involves independently activating and running the pump within the system for a preset time of, for example, 40 seconds. One aspect of the invention is that the dispensing system is closed while the pump is running; thus, the pump is pushing product into a "closed" pipe system. Due to the fluid dynamics of the accelerating product flow, and the elasticity of the pipe system, the pressure in the product line increases to a value that is greater than the discharge pressure of the pump. It has been determined that, for a typical pump discharge pressure of about 27 PSI, the pressure in the line increases to a value of between 30–35 PSI. As a result, the product in the line reverses flow and begins to move against the operating pump. This action causes a check valve in the system to close, trapping pressure in the line at 30–35 PSI.

The method of this invention generally involves calculating successive pressure decays and/or increases ($\Delta P_a$, $\Delta P_b$) within the product line based upon measurements of the product line pressure over a fixed period of time while the pump is running. In actuality, depending upon the magnitude of a leak, if any, and the change in line pressure due to thermal expansion/contraction of the fuel, the difference between successive pressure measurements ($P_1$, $P_2$), e.g., $\Delta P_a$, may be positive (an increase) or negative (a decrease). For ease of discussion, the term "pressure decay" will be employed in this disclosure and should be construed to cover both increases or decreases in the pressure decay value.

In a preferred embodiment, the initial pressure decay, $\Delta P_a$, may be calculated as follows: ten seconds after the pump is initiated, the line pressure is measured by use of a pressure sensor and recorded as $P_1$. When the timer reaches 40 seconds, a second measurement of the line pressure is recorded as $P_2$. $\Delta P_a$ is calculated by taking the absolute value of the difference between $P_1$ and $P_2$.

Thereafter, the pump is turned off and the timer is reset to zero and reinitiated. After the timer again reaches 15 minutes without any dispensing activity occurring, the same steps are employed to obtain a $\Delta P_b$ value, i.e., pressure samples are taken at 10 seconds and 40 seconds while the pump is running.

Thereafter, the method involves calculating a pressure decay gradient by taking the absolute value of $\Delta P_a$ minus $\Delta P_b$. If the pressure decay gradient is not less than 0.14 PSI, then another cycle is required. If another cycle is required, then the oldest pressure decay value (the original $\Delta P_a$) is discarded and the original value of $\Delta P_b$ is substituted and assigned as the new $\Delta P_a$. Fifteen minutes later a new $\Delta P_b$ is calculated and compared to $\Delta P_a$. This routine is continued until the pressure decay gradient (the absolute value of $\Delta P_a$ minus $\Delta P_b$) is less than a predetermined value, preferably 0.14 PSI.

Thereafter, after the pressure decay gradient is less than 0.14 PSI, the method involves comparing the value of the most recent pressure decay $\Delta P_b$ to certain predetermined values to determine if the product line is of acceptable tightness to pass the 0.1 GPH @ 40 PSI test as mandated by the EPA. If $\Delta P_b$ is less than 0.61 PSI, the pipe has passed the Precision Test. If $\Delta P_b$ is greater than 1.09 PSI, the product line has failed the Precision Test. If the value of $\Delta P_b$ falls between 0.61 PSI and 1.09 PSI, the testing is continued until a pass or fail reading is indicated, or until the test has been conducted for three hours during which $\Delta P_b$ falls within this range, at which time the system is declared to have passed the Precision Test.

One feature of the invention is that successive pressure decay values are calculated based upon product line pressure measurements taken over identical time intervals, i.e., the time interval for the pressure measurements is fixed while the pressure is allowed to fluctuate if a leak and/or thermal expansion or contraction are present. Additionally, the time difference between successive decays is the same, e.g., 15 minutes. Another feature of the invention is that the line pressure is maintained at a level above the pump discharge pressure while measuring the pressure values that used to calculate $\Delta P_a$ and $\Delta P_b$.

DETAILED DESCRIPTION OF PREFERRED EMBODIMENT

Figure 1:
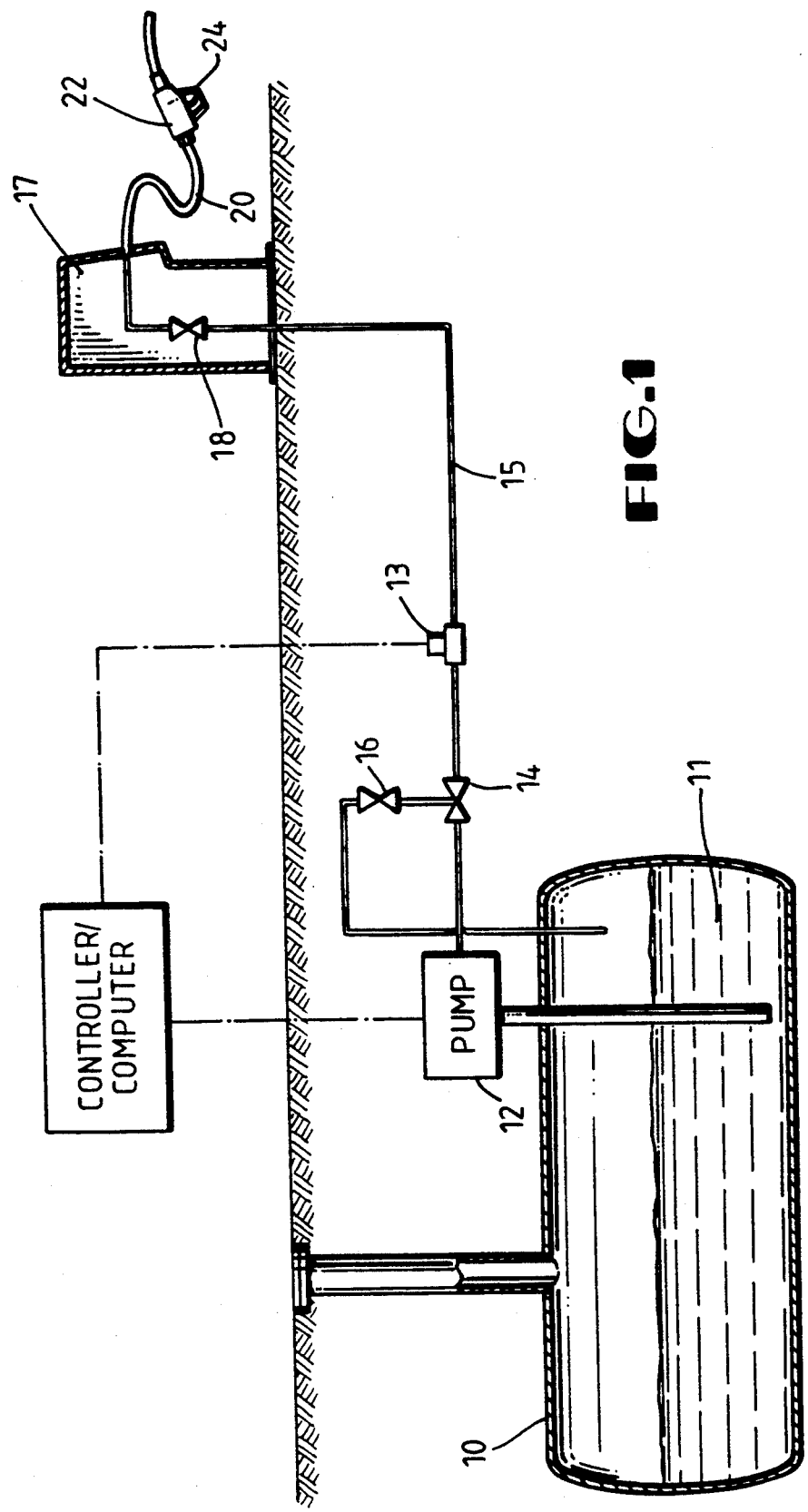
FIG. 1 shows the basic configuration of a typical underground storage system for hydrocarbon products.

Referring to FIG. 1, there is shown a tank 10, a product line 15, a pump 12, a check valve 14, pressure relief valve 16, pressure sensor 13, dispensing station 17, dispensing valve 18, hose 20 and dispensing nozzle 22. Typically, product line 15 is two inch pipe. Additionally, pump 12 normally maintains the pressure within product line 15 at approximately 27 PSI. However, the method disclosed herein is applicable to other systems having pumps that provide higher or lower discharge pressures, e.g., 40 PSI, etc., as the method disclosed herein is based upon an analysis of the difference in successive pressure readings over a fixed time, and does not depend upon the absolute magnitude of the pump discharge pressure.

In reality, a modern service station has many underground storage tanks with a plurality of product lines servicing various dispensing stations. More particularly, the product lines may be connected to a common header that would supply several different product lines with the same type of product, e.g., unleaded gasoline. For purposes of simplicity of discussion, only one such product line and tank is shown. However, the invention should not be construed as limited to a single such product line, it should be construed as covering all physical embodiments of storage tanks and associated product lines.

In operation, a hydrocarbon fuel 11, such as unleaded gasoline, or the like, is stored in tank 10 and dispensed through dispensing station 17 as required. In particular, a customer desiring service removes dispensing nozzle 22 from dispensing station 17, at which time pump 12 is activated, thereby increasing the pressure in product line 15. Upon pressing the nozzle lever 24, dispensing valve 18 is opened, thereby allowing fuel 11 from tank 10 to be pumped through product line 15 and into the customer's vehicle or receptacle. Upon completion of the pumping activities, the nozzle lever 24 is released and dispensing nozzle 22 is returned to dispensing station 17, and pump 12 is turned off.

In a preferred embodiment, an external check valve 14 with integral pressure relief valve 16 is incorporated into the product line 15, such that at the end of a dispensing cycle, the product line 15 retains the fuel 11 that has been pumped into it, thus permitting the fuel to be delivered immediately at the start of the next dispensing cycle. Typically, pumps used in this type of configuration contain an integral check valve/relief valve assembly within the pump itself. However, applicant has found that such internal check valve/relief valve assemblies are less reliable than the external check valve/relief valve combination set forth in the preferred embodiment. Nevertheless, the present invention method should not be construed as limited solely to a product line having an external check valve/relief valve assembly.

In a preferred embodiment, during the dispensing operation, the pump 12 maintains the product line pressure at approximately 27 PSI. Upon completion of a dispensing cycle, the dispenser switch is turned off, thus closing the dispensing valve 18 at the dispenser station 17, thereby stopping the pump 12. With the loss of pump pressure in the line (currently at approximately 27 PSI), the fuel begins to relieve back into the tank 10 causing the external check valve 14 to seat, effectively isolating the line between the dispensing valve and the check valve, thereby trapping the product in the line at a pressure above 25 PSI. However, the integral relief valve 16 within the external check valve 14 allows the fuel to pass through the check valve 14 until the pressure is lowered to approximately 20 PSI.

Initially, various prior art methods are employed to ensure that there are no leaks in the product lines in excess of three gallons per hour (defined as 10 PSI) as mandated by the EPA (hereinafter Hourly Test). The exact method and technique for passing this Hourly Test are not to be considered part of the inventive method disclosed and claimed herein; rather, the Precision Test method of the present application can be employed after any of a variety of prior art methods have been used to ensure that the product line passes the Hourly Test mandated by the EPA.

Upon successful completion of the Hourly Test, the inventive method disclosed and claimed herein (the Precision Test) is employed to ensure the product lines do not exceed the 0.1 GPH at 40 PSI, as mandated by the EPA. If the system does not pass the Hourly Test, then the Precision Test as disclosed and claimed herein is not attempted. Upon successful completion of the Hourly Test, a timer in the Precision Test is initiated. If any dispensing activities (sales) occur before the timer reaches a preset value of, for example, 15 minutes, the Precision Test is aborted. Additionally, if dispensing occurs at any time prior to the completion of the Precision Test, the Precision Test is aborted.

After reaching the preset value of 15 minutes without any dispensing activities, the pump 12 is started and runs for a predetermined time of, for example, 40 seconds in a preferred embodiment of the invention. The predetermined value of 15 minutes is a matter of choice that may be adjusted to a variety of values within certain practical constraints and should not be considered a limitation of the claims. Preferably, there is a delay prior to the initiation of the Pressure Test. This delay allows the product line to stabilize, i.e., the pressure fluctuations due to thermal effects are greatest shortly after "new" product is pumped into the product line. Therefore, any delay sufficient to provide for some stabilization of the product line is sufficient. In a preferred embodiment of the present method, a stabilization period of 15 minutes is employed prior to initiation of the Precision Test. Additionally, the period of 15 minutes was selected so that the test is not run during peak periods of sales of product, and because such frequent testing is not required. What is important is that successive pressure measurements be made over the same time interval. Additionally, the pump could be run for shorter or longer periods of time than the 40 seconds discussed in the preferred embodiment. What is important is that for each successive test, the pressure measurements ($P_1$ and $P_2$) are taken at identical times after activation of the pump, e.g., ten and forty seconds, respectively, in the preferred embodiment. Additionally, the initial pressure measurement, $P_1$, should be taken a few seconds after initiation of the pump so that any pressure fluctuations may stabilize. However, the various times discussed in the preferred embodiment, e.g., 15 minutes, ten seconds, and forty seconds, should not be considered as limitations of the present invention.

When the pump 12 is activated, the dispensing valve 18 in the dispenser station is closed and the pump 12 is running on command from the system rather than operator demand (sales). In this situation, the pump 12 is pushing product into a closed pipe system. The pressure in the line rapidly increases to a value of approximately 30-35 PSI, a pressure which is greater than the maximum sustainable pump pressure, which is typically about 27 PSI. This increase in pressure is due to the fluid dynamics of the accelerating product flow and the elasticity (bulk modulus) of the pipe system. Since the pressure in the line 15 is greater than the pressure in the pump 12, product flow in the line 15 reverses and begins to move against the operating pump 12. This action causes the check valve 14 to close trapping product in the line at a pressure between 30-35 PSI. As the pump 12 is still running, the pressure on the pump side of the check valve 14 stabilizes at approximately 27 PSI, while the pressure on the dispenser side of the check valve 14 is at approximately 30-35 PSI, a differential of between 3-8 PSI. Since the integral relief valve 16 requires 20 PSI differential to open, it is maintained closed since there is only a 3-8 PSI differential across the relief valve, even though the line pressure is above 20 PSI. In this condition, the line 15 is isolated from the pump 12 and the dispenser 17.

At this point, the following conditions may exist in the line:

A. A leak in the line: This will cause the line pressure to decay at a constant rate proportional to the leakage rate;

B. Thermal expansion: This will cause the line pressure to increase at a rate proportional to the temperature difference between the fuel and the surrounding environment. The increase in line pressure rate decreases with time as the temperature stabilizes, i.e., as the temperature difference between the fuel and the surrounding ground/pipe decreases;

C. Thermal contraction: This will cause the line pressure to decrease at a rate proportional to the temperature difference between the fuel and the surrounding environment. Likewise, the decrease in line pressure due to thermal contraction is reduced over time as the temperature stabilizes, i.e., as the temperature difference between the fuel and the surrounding ground/pipe decreases;

D. A leak with thermal expansion: Depending upon the size of the leak and the pressure effects due to the temperature difference between the product in the line and ambient ground, the line pressure could be increasing, decreasing, or stable;

E. A leak with thermal contraction: The line pressure will be decreasing.

Next, the method requires that a timer be initiated upon starting the pump 12 for the Precision Test. When the timer reaches a predetermined time, for example, 10 seconds, the line pressure is measured (through use of pressure sensor 13) and recorded as $P_1$. When the timer reaches a second predetermined time, for example, 40 seconds, another sample of the line pressure is recorded as $P_2$. The pump is then turned off and the timer is reset to zero and reinitiated. The method involves taking the absolute value of the difference between $P_1$ and $P_2$, and recording the result as the initial pressure decay $\Delta P_a$. Thereafter, when the timer indicates 15 minutes without a dispensing cycle, a second cycle is run sampling the line pressures over the same time interval, for example, 10 seconds and 40 seconds, and calculating a second pressure decay, $\Delta P_b$.

If the pressure decay gradient, calculated by taking the absolute value of $\Delta P_a$ minutes $\Delta P_b$ is greater than 0.14 PSI, then another cycle is required. The oldest test, the original $\Delta P_a$, is discarded and the value of $\Delta P_b$ is assigned as the new $\Delta P_a$. Fifteen minutes later, a new $\Delta P_b$ is calculated and compared. This routine is continued until the absolute value of $\Delta P_a$ minus $\Delta P_b$ is less than 0.14 PSI.

When the pressure decay gradient ($\Delta P_a$ minus $\Delta P_b$) is less than or equal to 0.14 PSI, then the value of $\Delta P_b$, the most recent test, is compared to the following values to determine whether the product line is of acceptable tightness (passes the 0.1 GPH test):

A. $\Delta P_b < 0.61$ PSI = PASS TEST;

B. $\Delta P_b > 1.09$ PSI = FAIL TEST;

C. $0.61$ PSI $< \Delta P_b < 1.09$ PSI = the test results are indeterminate and the system continues running cycles until conditions A or B above are met or until the test continues for three hours and remains within this range, at which time the system declares PASS TEST.

In all cases, the various pressure measurements and calculations are stored/performed through use of a computer and/or controller, the use and configuration of which are readily known to those skilled in the art. Of course, the information as to acceptability of a product line is displayed on a control panel (not shown) within the service station. If the product line fails the Precision Test, the pump 12 may be automatically disabled and/or alarmed such that additional product cannot be pumped until the leak has been located and repaired.

The method disclosed herein is applicable to various line sizes. In particular, the values disclosed herein are applicable to both two and three inch diameter pipes that are typically used in underground storage systems. However, the method disclosed herein may be used on larger line sizes, but would require calibration of new pass/fail values that are compared to $\Delta P_b$, i.e., new values would have to be calculated to replace the 0.61 PSI and 1.09 PSI values applicable to both 2 and 3 inch pipe. However, the acceptable value for the pressure decay gradient (0.14 PSI) would remain unchanged.

Although the invention method has been disclosed in terms of a preferred embodiment, the invention should not be construed as limited to the specific embodiments and techniques disclosed herein; rather, the inventive method should be construed to cover all techniques for detecting leaks from pressurized piping systems as defined by the claims.

What is claimed is:

1. A method of detecting leaks from a pressurized product line, comprising the steps of:
   a) activating a pump to increase the pressure in said product line to a pressure greater than the pump discharge pressure;
   b) calculating first and second pressure decays in said product line, each of said decays based upon measurements of said line pressure made while the pump is running and wherein said line pressure is maintained at a pressure greater than the pump discharge pressure during said pressure measurements;
   c) calculating a pressure decay gradient by taking the absolute value of the difference between said first and second pressure decays; and
   d) after the pressure decay gradient is less than a predetermined acceptable value, determining whether the product line is of acceptable tightness by comparing the value of the second pressure decay to predetermined values reflecting acceptable or unacceptable tightness for said product line.

2. A method as recited in claim 1, wherein said step of calculating each of said first and second pressure decays comprises the step of measuring first and second pressures in said product line at the same predetermined times after activation of said pump.

3. A method as recited in claim 2, wherein said predetermined times are ten and forty seconds for said first and second pressure measurements, respectively.

4. A method as recited in claim 1, wherein said step of activating said pump further comprises the step of raising said line pressure approximately 3-8 PSI above the pump discharge pressure.

5. A method as recited in claim 1 wherein said predetermined acceptable absolute value is about 0.14 PSI.

6. A method as recited in claim 1, wherein said step of determining whether the product line is of acceptable tightness comprises the steps of:
   declaring the product line has passed the precision test when the second pressure decay is less than about 0.61 PSI;
   declaring the product line has failed the precision test when the second pressure decay is greater than about 1.09 PSI; and
   declaring the product line has passed the precision test when the second pressure decay falls between about 0.61 PSI and 1.09 PSI over a 3 hour period of testing.

7. A method of detecting leaks from a product line, comprising the steps of:
   a) calculating first and second pressure decays, said second pressure decay being calculated after said first pressure decay, each said pressure decay calculation comprising the steps of:
      (1) activating a pump to increase the pressure in said product line to a pressure greater than the pump discharge pressure;
      (2) measuring a first pressure in said product line while said pump is running, said first pressure measurement being taken at first predetermined time after activation of said pump;
      (3) measuring a second pressure in said product line while the pump is running, said second pressure measurement being taken at a second predetermined time after activation of said pump; and
      (4) calculating each of said first and second pressure decays by taking the absolute value of the difference between said first and second pressure decays;
   b) calculating a pressure decay gradient by taking the absolute value of the difference between said first pressure decay and said second pressure decay; and
   c) after the pressure decay gradient is less than a predetermined acceptable value, determining whether the product line is of acceptable tightness by comparing the value of the second pressure decay to predetermined values reflecting acceptable and unacceptable tightness for said product line.

8. A method as recited in claim 7, wherein said step of activating said pump further comprises the step of raising said line pressure approximately 3-8 PSI above the pump discharge pressure.

9. A method as recited in claim 7, wherein said step of calculating first and second pressure decays further comprises step of isolating the product line to entrap the product in said line while the pump is running.

10. A method as recited in claim 7, wherein said first and second predetermined times are ten and forty seconds, respectively.

11. A method as recited in claim 7, wherein said step of determining whether the product line is of acceptable tightness, further comprises the steps of:
   declaring the product line has passed the precision test when the second pressure decay is less than about 0.61 PSI;
   declaring the product line has failed the precision test when the second pressure decay is greater than about 1.09 PSI; and
   declaring the product line has passed the precision test when the second pressure decay falls between about 0.61 PSI and about 1.09 PSI over a 3 hour period of testing.

* * * * *

UNITED STATES PATENT AND TRADEMARK OFFICE
CERTIFICATE OF CORRECTION

PATENT NO. : 5,317,899

DATED : June 7, 1994

INVENTOR(S) : Hutchinson et al.

It is certified that error appears in the above-identified patent and that said Letters Patent is hereby corrected as shown below:

Column 8, lines 30 and 31, for "pressure decays" read -- pressures --.

Signed and Sealed this

Twenty-first Day of October 1997

Attest:

BRUCE LEHMAN

Attesting Officer

Commissioner of Patents and Trademarks